(12) United States Patent
Godzwon et al.

(10) Patent No.: US 9,524,405 B2
(45) Date of Patent: Dec. 20, 2016

(54) COLLABORATING RFID DEVICES

(75) Inventors: Krzysztof Leszek Godzwon, Eindhoven (NL); Jerzy Husakowski, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1760 days.

(21) Appl. No.: 12/097,790

(22) PCT Filed: Dec. 5, 2006

(86) PCT No.: PCT/IB2006/054603
§ 371 (c)(1),
(2), (4) Date: Jun. 17, 2008

(87) PCT Pub. No.: WO2007/072264
PCT Pub. Date: Jun. 28, 2007

(65) Prior Publication Data
US 2008/0309463 A1      Dec. 18, 2008

(30) Foreign Application Priority Data
Dec. 21, 2005   (EP) .................................... 05112571

(51) Int. Cl.
*H04Q 5/22* (2006.01)
*G06K 7/00* (2006.01)
*G06K 7/10* (2006.01)

(52) U.S. Cl.
CPC ......... *G06K 7/0008* (2013.01); *G06K 7/10019* (2013.01)

(58) Field of Classification Search
None
See application file for complete search history.

(56) References Cited

U.S. PATENT DOCUMENTS

| | | | | |
|---|---|---|---|---|
| 5,719,387 A | * | 2/1998 | Fujioka | 235/492 |
| 5,763,862 A | * | 6/1998 | Jachimowicz et al. | 235/380 |
| 7,652,556 B2 | | 1/2010 | Breitfuss et al. | 340/10.1 |
| 7,907,732 B2 | * | 3/2011 | Yarvis | 380/270 |
| 2004/0246103 A1 | * | 12/2004 | Zukowski | 340/10.41 |
| 2005/0061875 A1 | | 3/2005 | Zai et al. | |
| 2005/0061879 A1 | * | 3/2005 | Honda | 235/385 |
| 2005/0099268 A1 | | 5/2005 | Juels et al. | |

(Continued)

FOREIGN PATENT DOCUMENTS

| | | |
|---|---|---|
| EP | 1017005 A2 | 7/2000 |
| EP | 1387313 A2 | 2/2004 |

(Continued)

*Primary Examiner* — Curtis King
(74) *Attorney, Agent, or Firm* — Larry Liberchuk

(57) ABSTRACT

Cooperative RFID devices are provided that are aware of other RFID devices in their near vicinity (field range), and their operational pattern depends on presence of these other devices. If a cooperative RFID device is alone in the RF field of a reader terminal, it will allow operation of a first type (e.g. not allowing complex communication, but only allowing responses to requests for non-sensitive data or completely concealing its presence by not allowing any transmission at all) and when another defined and known RFID device is detected in the same RF field, operation of a second type is allowed (e.g. allowing any data transfer, responding to requests for any data, including sensitive data, etc.).

18 Claims, 3 Drawing Sheets

(56) References Cited

U.S. PATENT DOCUMENTS

| | | | |
|---|---|---|---|
| 2006/0033608 A1* | 2/2006 | Juels et al. | 340/10.1 |
| 2008/0157927 A1* | 7/2008 | Soppera et al. | 340/10.1 |
| 2008/0192932 A1* | 8/2008 | Graeber et al. | 380/258 |
| 2010/0045443 A1* | 2/2010 | Steeves | 340/10.5 |

FOREIGN PATENT DOCUMENTS

| | | |
|---|---|---|
| JP | 2001283171 A | 10/2001 |
| JP | 2003296682 A | 10/2003 |
| WO | WO02086808 A1 | 10/2002 |
| WO | WO03098851 A1 | 11/2003 |
| WO | WO2004109481 A1 | 12/2004 |

\* cited by examiner

COLLABORATING RFID DEVICES

FIELD OF THE INVENTION

The present invention relates to a method for controlling communication in a radio frequency (RF) identification (ID) system, an RFID device and an RFID system.

BACKGROUND

The use of radio frequency identification (RFID) technology has evolved to such an extent that it has become an every-day item used in a large number of applications. Examples of such uses are scanning and identification of items/articles in boxes, identification and authorization when requesting access to, e.g., a bank account via an ATM, when requesting entry via a building entrance locked by means of an electronic lock, e.g. a hotel room, or when starting a vehicle whose engine starting mechanism is protected by an electronic lock. Very simple RFID devices are used as identification tags attached to items in shops for the purpose of theft protection.

RFID devices are activated by an RF field produced by an antenna connected to a reader/writer terminal, typically being integrated within an access control or an authorization mechanism as exemplified above. The RFID devices comprise a control unit, which typically holds private and proprietary information, and which is integrated in the device together with a coil inductor antenna. The coil inductor antenna is used to draw necessary supply of power for operation from the RF electromagnetic field provided by the reader terminal. Additionally, through the same RF field the control unit is communicating modulated information with the reader terminal. The mechanism is standardized as described, e.g., in ISO/IEC 14443.

One of the features of RFID devices is the identification based on the unique serial number embedded in the device. It is impossible to change that number and a manufacturer guarantees that no duplicates are ever present. It is also a very difficult task to make a duplicate with the same serial number.

RFID devices are configured to interact and communicate information that is stored in internal memory with a reader terminal whenever the device is placed within reach of an appropriately configured RF electromagnetic field, irrespective of whether or not a user/owner of the card is aware of such an RF field being present. This means that it is difficult for a user/owner to have total control over access to the information stored in the device.

The interaction between the RFID device and the reader terminal is performed in a query-response manner, where the reader transmits requests to the device, and the device responds by transmitting reply data. The content carried by such interaction may be either simple (e.g. the device identifies itself to the reader by an identifying number, ID), or complex (e.g. the device and the reader perform an authentication scheme and exchange a session encryption key).

When multiple devices are present in vicinity of a reader, a collision detection protocol is used to determine the number of devices and their IDs, so that the reader can query a specific device, indicated with its own unique ID. When a single device is present in the field, no collision with another occurs, and the device is able to respond to the queries without disturbance.

That is, typical usage of RFID is oriented towards ensuring that a RFID device is readable and writeable: if a device is alone in the RF field, there is no interference from other devices and the device is readable and writeable. If there are multiple devices present in the same RF field, special communication procedures are used to make sure all tags are readable and writeable.

A drawback with prior art RFID systems is hence that RFID devices will respond to any legitimate read/write request from any compatible reader. Anyone equipped with a reader is able to retrieve or modify data stored in an RFID device. In areas where data security is crucial, secure, smart devices must be used to protect the data cryptographically. These devices are expensive, have complex structure, and require complex software on a reader for normal operation. An example of such prior art is to be found in United States Patent Application Publication 2005/0099268A1, which discloses a radio frequency identification system with privacy policy implementation based on device classification.

SUMMARY OF THE INVENTION

An object of the present invention is hence to overcome drawbacks related to prior art RFID systems as discussed above. This object is achieved by way of providing cooperative RFID devices that are aware of other RFID devices in their near vicinity (field range), and their operational pattern depends on presence of these other devices. If a cooperative RFID device is alone in the RF field of a reader terminal, it will allow operation of a first type (e.g. not allowing complex communication, but only allowing responses to requests for non-sensitive data or completely concealing its presence by not allowing any transmission at all) and when another defined and known RFID device is detected in the same RF field, operation of a second type is allowed (e.g. allowing any data transfer, responding to requests for any data, including sensitive data, etc.).

Hence, in a first aspect the present invention provides a method for controlling communication in an RFID system between a first device and a reader terminal, wherein the first device performs the steps of performing operation of a first type, detecting whether broadcasting is performed from at least a second device in the RFID system and thereby determining whether a detection state exists. If the detection state exists, the first device is configured to perform operation of a first type, and if the detection state does not exist, the first device is configured to continue only performing operation of said first type.

The operation of a first type may comprise receiving data. The operation of a first type may also comprise broadcasting a first data sequence that may be any non-sensitive data. Operation of the second type may comprise communication with entities in the RFID system, including responding to a request for an identifier of the first device. Operation of the second type may also entail operational procedures that are more or less unrelated to communication with other entities, such as simply changing a state within the processing environment in the device controller or more tangible state changes such as changing the appearance in terms of, e.g., color of the device etc.

In other words, the invention provides an operational pattern for RFID devices, which may be denoted "cooperative". That is, when a cooperative RFID device is placed in the RF field of a reader terminal, it will operate in a first manner, e.g. keeping silent altogether or respond to the reader with non-sensitive data. It will continue to operate in this first manner as long as it is the only RFID device present in the RF field. When one or more other RFID device is placed in the same RF field, the collaborative device will detect the presence of the other device by listening to communication performed by the other RFID device, e.g. detecting a collision, which will occur when two or more devices proceed to broadcast. Only then will the collaborative device allow operation in a second manner, e.g. allowing further communication, typically involving read/write requests issued by the reader terminal, regarding more sensitive data such as an identifier of the collaborative device.

The invention may, for example, use already existing RFID collision detection mechanisms to influence the behavior of a device in the following way: if a cooperative device detects no collision during its initial introduction by broadcasting of non-sensitive data, the device refuses to respond to other commands. It will keep responding to queries for non-sensitive data only, until a collision occurs. After a detected collision, the device can deduct there is another RFID device present in the RF field, and allow further communication.

Furthermore, if the detection state exists, the invention may also comprise receiving at least one data item, e.g. an identifier, broadcast from at least the second device and configuring the first device depending on the received at least one data item.

In other words, a cooperative RFID device may, after detecting one or more RFID devices in the same RF field, retrieve, by only listening, a data item such as the ID of the other devices present in the field. This other device does not have to be a cooperative device. The operational behavior of the cooperative device may be influenced by the ID of the other device: if it is a known and trusted ID, the cooperative device will carry on with a new type of operation, such as communication, or otherwise only continue operating by, e.g., keeping silent.

A cooperative device may hence listen to more than one other device and pick up responses from multiple devices. Then, if an appropriate combination of devices is present in the field, a new type of operation is allowed such as data release. A cooperative device may also pick up only some pieces of data, or follow more or less complex algorithms to deduct if an appropriate combination of devices is really present in the vicinity.

A cooperative device can be made to work only in presence of a certain other RFID device, or a group of devices (i.e. "trusted" devices), therefore restricting the access to its stored data based on a presence principle.

Hence, the step of enabling said first device to perform operation of a second type may comprise providing a first and/or a second type of access to data storage means in the first device. These types of access may be those of read access and write access, respectively.

Furthermore, the step of receiving at least one data item, such as an identifier, may comprise receiving a plurality of data items from a plurality of respective devices and the configuring of the first device may comprise providing a first type of access to the storage means in case a first data item is received and providing a second type of access to the storage means in case a second data item is received.

In other words, depending on the data item, such as the identity, of other RFID devices present in the same RF field, a cooperative device may regulate access to data in its storage means based on privileges associated with the data items of these other RFID devices. For example, a cooperative device may grant read-only access to stored data when a device with ID1 is present, write-only access when a device with ID2 is present, read-write access to stored data when a device with ID3 is present, etc.

Hence, in an advantageous manner the present invention provides a data protection mechanism based on the principle of presence of trusted RFID device(s) in vicinity, which allows data release. Reader terminals are unable to retrieve or modify data stored on the RFID device, unless the device verifies data release conditions. When such conditions are met (trusted devices are present), even a simple already existing reader terminal is able to access data stored in the RFID device without restrictions. If necessary, any restriction and any access policy can be achieved on individual device basis, however at the cost of increasing the complexity of the cooperative device.

Moreover, since there is no specific need for cryptographic protocols during communication as discussed above, the controlling software running in the reader terminal may be relatively simple. The logic running on a cooperative RFID device may also be realized in quite a simple manner, for example in that existing collision detection mechanisms are used.

In other aspects, the present invention provides an RFID device as well as an RFID system, having corresponding features and advantages as described above.

BRIEF DESCRIPTION OF THE DRAWINGS

The invention will now be described in terms of preferred embodiments and with reference to the attached drawings on which.

PREFERRED EMBODIMENTS

Figure 1:
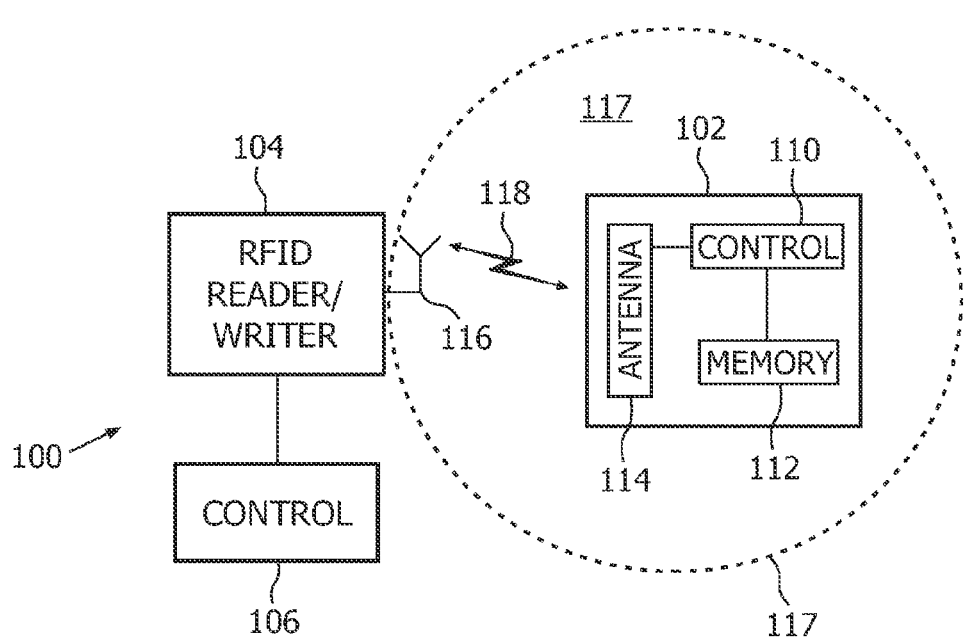
FIG. 1 schematically shows an RFID system.

A typical RFID system 100 is schematically depicted in FIG. 1. An RFID reader/writer terminal 104 generates, and transmits via an antenna 116, an RF electromagnetic field 117 having an outer boundary 117' as indicated in FIG. 1. The boundary 117' of the RF field is to be interpreted not as a boundary at which RF field strength is at a specific level, but as a boundary within which communication with RFID devices is possible. Within the RF field 117 is an RFID device 102 located. The RFID device, which may be in the form of a contact-less smart card, a tag etc., comprises a coil antenna 114 configured to interact with the RF field 117 by receiving RF energy and convey modulated data from the reader/writer terminal 104. The antenna 114 is connected to an RFID device control unit 110, which comprises programmable circuitry for executing firmware and software instructions for controlling communication with the reader/writer terminal 104 as well as performing any necessary processing including receiving data, processing data and storing data in a storage unit 112. Hence, the storage unit 112, which is connected to the control unit 110, holds data comprising at least a unique identifier of the RFID device 102 and also any other information that is application dependent, as will be exemplified below.

The RFID reader/writer terminal 104 forms part of the system 100 in which a control computer system 106 operates to provide and receive data from, typically, a plurality of RFID devices such as the device 102. In a typical application, the control computer system 106 operates in an application specific manner as will be exemplified below.

Figure 2A:
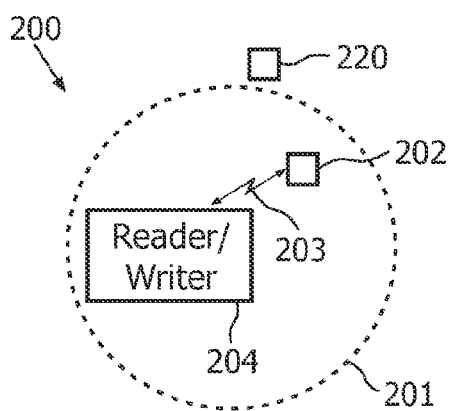
FIGS. 2a and 2b schematically show an RFID system configured to operate in accordance with the present invention.
Figure 2B:
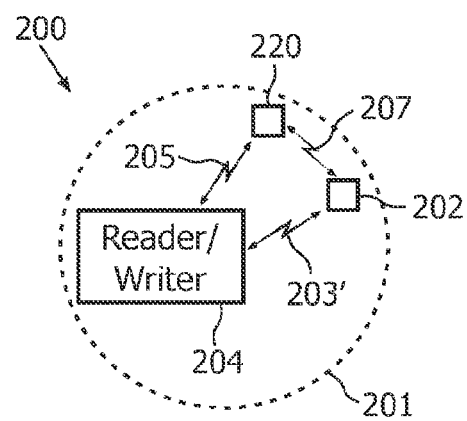
Figure 3:
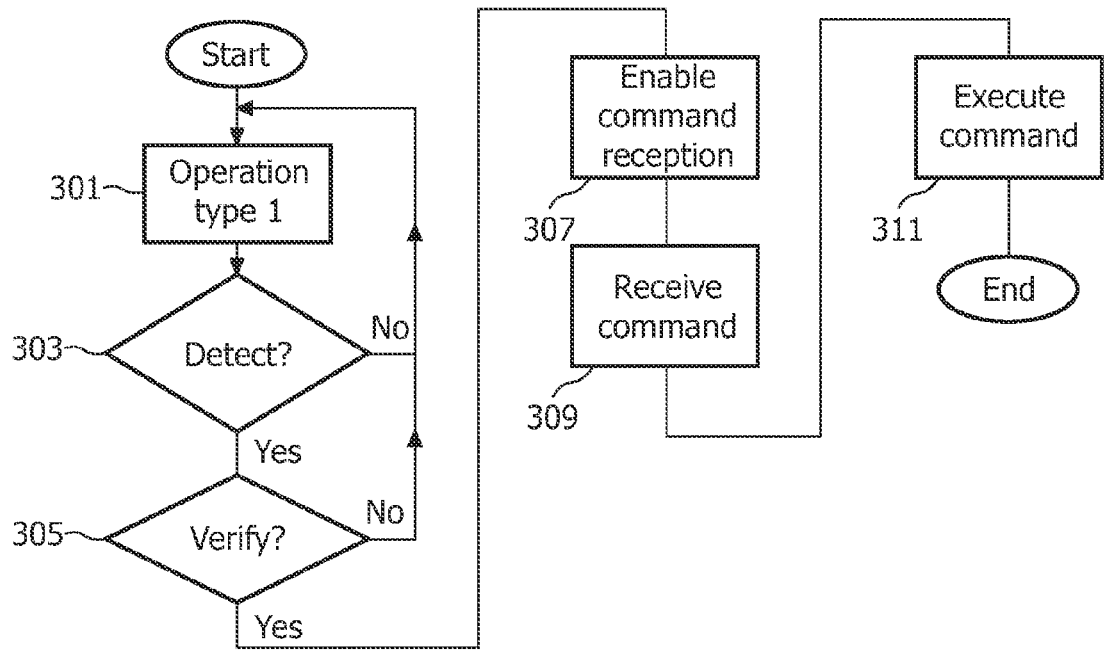
FIG. 3 is a flow chart illustrating a method of controlling communication in an RFID system according to the present invention, FIG. 4 schematically show an RFID system configured to operate in accordance with the present invention.

Turning now to FIGS. 2a, 2b and FIG. 3 an RFID system 200, such as the system 100 described with reference to FIG. 1, will be described that operates in accordance with the present invention.

FIG. 2a illustrates a situation at a first point in time when a reader/writer terminal 204 generates an RF field having a boundary 201 within which a first RFID device 202 is located. A first communication channel 203 is indicated between the reader/writer terminal 204 and the first RFID device 202. A second RFID device 220 is located outside the boundary 201 of the RF field and is hence not capable of communicating with the reader/writer terminal 204.

FIG. 2b illustrates a situation at a second point in time at which the reader/writer terminal 204 continues to generate the RF field and the first RFID device remains in connection 203' with the reader/writer terminal 204. However, at this second point in time, the second RFID device 220 has been relocated to a position within the boundary 201 of the RF field generated by the reader/writer terminal 204. Hence, a second communication channel 205 is present, between the reader/writer terminal 204 and the second RFID device 220. As will be discussed in more detail below, by the relocation of the second RFID device 220 into the RF field generated by the reader/writer terminal 204, a third communication channel 207 arises between the first device 202 and the second device 220.

Now with reference to the flow chart in FIG. 3 as well as to FIGS. 2a and 2b, a method of controlling communication between the entities illustrated in FIGS. 2a and 2b will be discussed. The method is described from the point of view of the first RFID device 202 and execution of software instructions implementing the method is performed by a controller and associated memory circuitry in the first device 202. Although not explicitly illustrated in FIGS. 2a and 2b, such circuitry is similar to the circuitry of the RFID device 102 described with reference to FIG. 1.

In an operating step 301 and a detection step 303 the first RFID device 202 performs a first type of operation by either keeping silent (and thereby concealing its presence) or repeatedly broadcasting non-sensitive data such as a random data sequence, triggered by the reader/writer terminal 204 via the RF field as is known in the art, and detects whether or not any other entity broadcasts data, such as an ID, in the RF field. If the device 202 detects another entity broadcasting, e.g. detects a broadcast collision, the operation of the device 202 continues to a verification step 305. During the verification step 305, the controller (not shown in FIG. 2) verifies that the other entity present in the RF field is correct. If not correct, the sequence of steps returns to step 301. If the other entity is verified in step 305, the sequence of steps continues in an enabling step 307 and establishes that operation of a second type is to be allowed by continued execution of operational instructions. During the continued execution the device 202 receives, during a reception step 309, from the reader/writer terminal 204, via the modulated RF field, a command to perform a specific operation. The specific operation is, of course, application specific and may entail reading protected data stored in the RFID device 202, e.g. sensitive data such as an identifier, and conveying this data to the reader/writer terminal 204 as will be exemplified below. The specific command is then executed in an execute command step 311.

Figure 4:
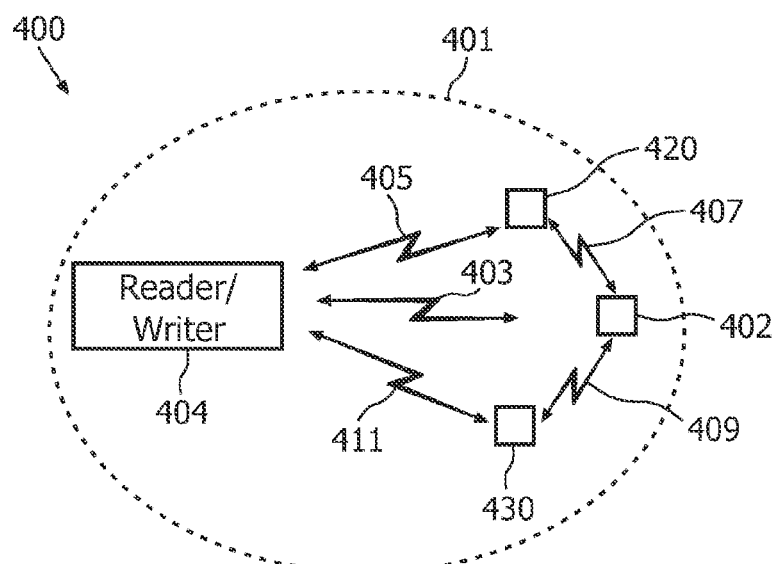
Figure 5:
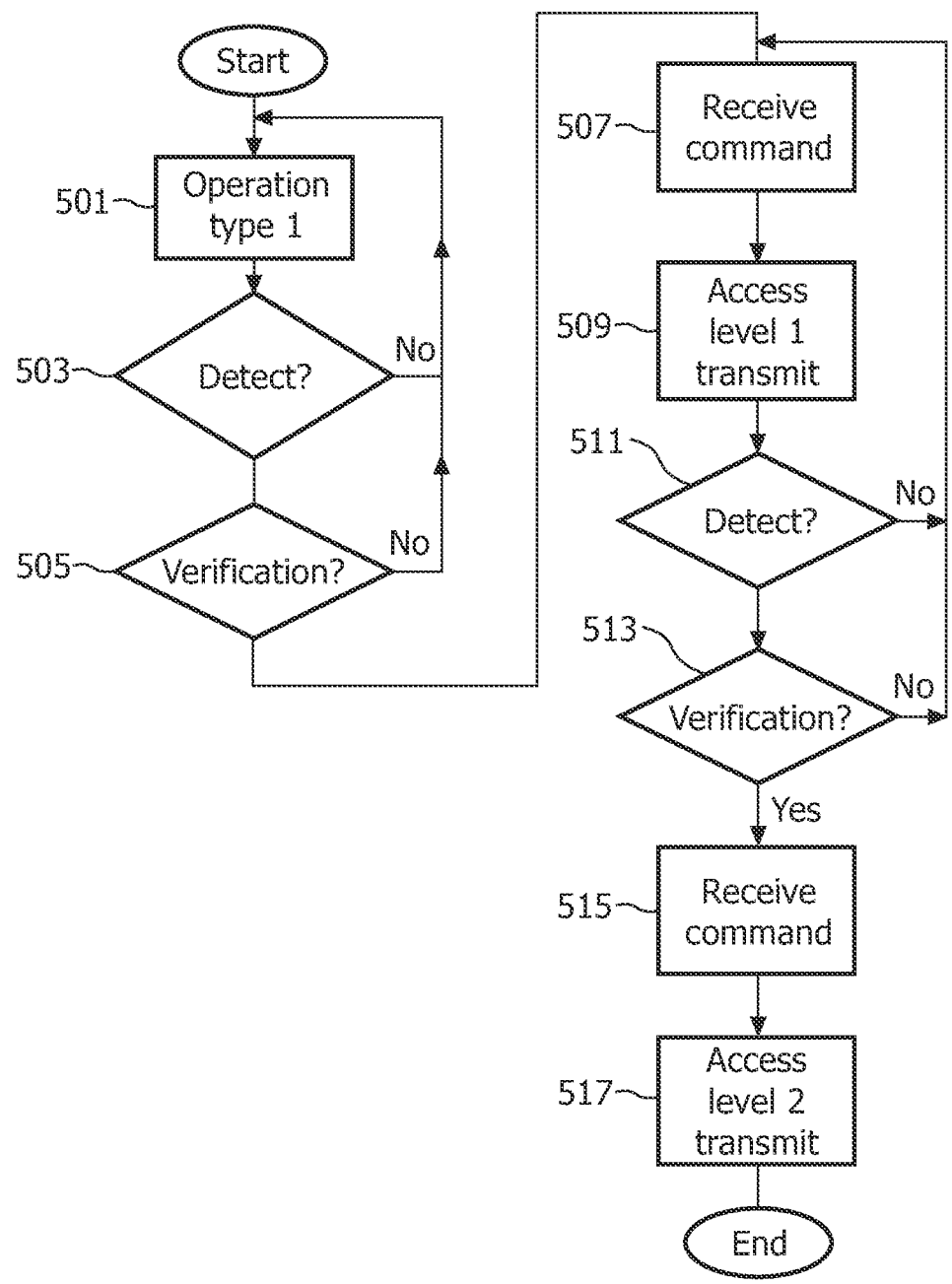
FIG. 5 is a flow chart illustrating a method of controlling communication in an RFID system according to the present invention.

FIGS. 4 and 5 will illustrate another example of the present invention in which a first RFID device performs a specific operation only when two other devices have been brought into the RF field of an RFID reader terminal.

FIG. 4 illustrates a situation in a system 400 similar to that in FIG. 2b. That is, FIG. 4 illustrates a situation at a point in time at which a reader/writer terminal 404 has continued to generate an RF field as defined by a boundary 401, and a first RFID device 402 remains in connection 403 with the reader/writer terminal 404. Moreover, at this point in time, a second RFID device 420 and a third RFID device 430 have been brought to a respective position within the boundary 401 of the RF field generated by the reader/writer terminal 404. Hence, a second and a third communication channel 405, 411 are present, between the reader/writer terminal 404 and the second and third RFID devices 420, 430, respectively. Further, similar to the situation in FIG. 2b, a fourth and fifth communication channel 407, 409 have also been established between the first and the second device 402, 420 and the first and third device 402, 430, respectively.

The second and third RFID devices 420, 430 may also be connected via a communication channel. However, for the purpose of this example, description of such a channel is omitted for the sake of clarity.

Turning now to FIG. 5, in an operating step 501 and a detection step 503 the first RFID device 402 performs a first type of operation by either keeping silent (and thereby concealing its presence) or repeatedly broadcasting non-sensitive data such as a random data sequence, triggered by the reader/writer terminal 404 via the RF field as is known in the art, and detects whether or not any other entity also broadcasts data, such as an ID, in the RF field. If the device 402 detects another entity broadcasting, i.e. detects broadcasting from any of the second device 420 and the third device 430, the operation of the device 402 continues to a verification step 505. During the verification step 505, the controller (not shown in FIG. 4) verifies that the other entity present in the RF field is the second device 420 by checking it's transmitted data. If not correct, the sequence of steps returns to step 501.

If the other entity is verified to be the second device 420 in step 505, the sequence of steps continues in a command reception step 507 during which the device 402 receives from the reader/writer terminal 404 a command to perform a specific type of operation, such as providing specific stored data having a first level of access restrictions, e.g. more sensitive data such as an identifier. Thereby, the presence in the RF field of the second device 420 enables access for the reader/writer terminal 404 to the first access level data stored in the first device 402. The reader/writer terminal 404 is then provided with the data in a transmission step 509.

Unless the device 402 detects, in a detection step 511, broadcasting from any other device, command reception and data transmission in steps 507 and 509, respectively, continues. If the device 402 detects another entity broadcasting, i.e. detects broadcasting from any of the second device 420 and the third device 430, the operation of the device 402 continues to a second verification step 513. During the verification step 513, the controller (not shown in FIG. 4) verifies that the other entity present in the RF field is the third device 430 by checking it's transmitted data. If not correct, the sequence of steps returns to step 507 and access to data at the first access level is maintained.

If the other entity is verified to be the third device 430 in step 513, the sequence of steps continues in a command reception step 515 during which the device 402 receives from the reader/writer terminal 404 a command to perform a specific type of operation, such as providing specific stored data having a second level of access restrictions. Such data may include data that is more sensitive than data having the first level access restriction. Thereby, the presence in the RF field of the third device 430 enables access for the reader/writer terminal 404 to the second access level data stored in the first device 402. The reader/writer terminal 404 is provided with the data in a transmission step 517.

The examples above are schematically described embodiments of the present invention. These are applicable within a large number of specific application environments where a simple and inexpensive solution for protection of data stored on an RFID device is needed.

For example, in an application involving postal package tagging, cooperative tags may contain "public" information about the destination address, and "private" information about the sender and contents. The "private" information being accessible only by security or customs officials in case of suspicious packages.

Another area of application is that of covert serial numbering of products: an RFID tag can release "public" data comprising information regarding a manufacturer of the product to any reader, but in presence of a secret manufacturer's RFID device, e.g. in the form of a contact-less smart card, will release additional information such as a "private" serial number, which can allow a detailed tracking of the product, e.g., during it's progress along a sales chain.

Yet another area of application is as a guard of privacy: a cooperative RFID tag can be used to store all personal information (name, photograph, address, etc.), but this data will be only released in presence of government security official (e.g. during passport control).

Yet another are of application in which RFID devices that conceal their presence may be used, is tagging of personal items. The items would respond with their unique identifiers and data only in presence of their owner's RFID device, trusted to the group of tags. The items wouldn't appear as equipped with RFID devices otherwise, which would render e.g. unsolicited item tracking useless. Privacy protection as offered by this application area is a valuable feature that existing solutions often lack.

The invention claimed is:

1. A method for controlling communication in a radio frequency identification (RFID) system between a first RFID device and a reader/writer terminal, comprising:
   performing by the first RFID device an operation of a first type,
   determining whether a detection state exists by detecting whether broadcasting is performed from at least a second RFID device in the RFID system, and
   when said detection state exists, allowing said first RFID device to perform operation of a second type, said operation of a second type being different from said operation of a first type, said operation of a second type including responding to a request from said reader terminal for an identifier of said first RFID device;
   when said detection state exists, receiving at least one data item broadcast from at least said second RFID device and configuring said first RFID device to operate depending on said received at least one data item; and
   receiving a plurality of data items from a plurality of respective RFID devices.

2. The method according to claim 1, wherein said first RFID device is arranged to continue performing operation of said first type only, when said detection state does not exist.

3. The method according to claim 1, wherein said operation of a first type comprises receiving data.

4. The method according to claim 1, wherein said operation of a first type comprises broadcasting a first data sequence.

5. The method according to claim 1, wherein said operation of a second type comprises communication with a device in the RFID system.

6. The method according to claim 1, wherein said data item comprises an identifier.

7. The method according to claim 1, further comprising providing a first type of access to data storage in said first RFID device.

8. The method according to claim 7, further comprising providing a second type of access to data storage in said first RFID device.

9. The method according to claim 1, wherein the configuring of said first RFID device comprises providing a first type of access to storage when a first data item is received and providing a second type of access to said storage when a second data item is received.

10. The method according to claim 8, wherein said first type of access is read access and said second type of access is write access.

11. The method according to claim 1, wherein said operation of a second type comprises changing a state of the first RFID device.

12. An a radio frequency identification (RFID) device comprising:
    control and communication circuit configured to perform operation of a first type, to determine whether a detection state exists by detecting whether broadcasting is performed from at least a second RFID device, when said detection state exists, to allow said RFID device to perform operation of a second type, said operation of a second type being different from said operation of a first type, said operation of a second type including responding to a request for an identifier;
    when said detection state exists, receiving at least one data item broadcast from at least said second RFID device and configuring said first RFID device to operate depending on said received at least one data item; and
    receiving a plurality of data items from a plurality of respective RFID devices.

13. The RFID device according to claim 12, said RFID device being arranged as an RFID tag.

14. The RFID device according to claim 12, said RFID device being arranged as an RFID transponder.

15. The RFID device according to claim 12, said RFID device being arranged as a contact-less smart card.

16. A method for controlling communication in a radio frequency identification (RFID) system between a first RFID device and a reader/writer terminal, comprising:
    receiving by said first RFID a first query from said reader/writer terminal;
    transmitting a first response by said first RFID to said first query, said first response being of a first type in accordance with operation of said first RFID device in a first mode that has limited functionality;
    when a collision is detected by said first RFID device to have occurred between said first response and a response to said first query by a second RFID device of said RFID system, operating said first RFID device in a listen-only mode for a prescribed period of time to enable said first RFID device to receive at least one data item transmitted from at least said second RFID device in response to a second query from said reader/writer terminal to which said first RFID device will not respond; and when at least one data item is received by said first RFID device from said second RFID device in response to said second query and said second data item is recognized by said first RFID device as indicating that said first RFID device should operate in a second mode having functionality other than that available in said first mode, operating said first RFID device in said second mode.

17. A method for controlling communication in a radio frequency identification (RFID) system between a first RFID device and a reader/writer terminal, comprising:

performing by said first RFID device an operation of a first type;

determining whether a detection state exists by detecting whether broadcasting is performed from a second RFID device in said RFID system;

when said detection state exists, allowing said first RFID device to perform an operation of a second type, said operation of a second type being different from said operation of a first type, said operation of a second type including responding to a request from said reader/writer terminal for an identifier of said first RFID device; and when said detection state exists, receiving by said first RFID device at least one data item broadcast from each of a plurality of respective RFID devices and configuring said first RFID device to operate depending on said received data items.

18. The method according to claim 17, wherein said second RFID device is one RFID device of said plurality of RFID devices.

* * * * *